United States Patent [19]

Menell et al.

[11] 3,888,292

[45] June 10, 1975

[54] PNEUMATIC VEHICLE TIRE

[75] Inventors: Hans Menell, Ahlem; Rach Heinz-Dieter, Garbsen, both of Germany

[73] Assignee: Continental Gummi-Werke Aktiengesellschaft, Hannover, Germany

[22] Filed: July 12, 1973

[21] Appl. No.: 378,418

[30] Foreign Application Priority Data
July 14, 1972 Germany.......................... 2234657

[52] U.S. Cl. ............................................... 152/362
[51] Int. Cl. ............................................ B60c 15/06
[58] Field of Search ................. 152/362 R, 362 CS

[56] References Cited
UNITED STATES PATENTS

| | | | |
|---|---|---|---|
| 3,044,523 | 7/1962 | Drakeford et al. ............... | 152/362 R |
| 3,612,138 | 10/1971 | Ravenhall ....................... | 152/362 R |
| 3,736,973 | 6/1973 | Mezzanotte et al. ............ | 152/362 R |

*Primary Examiner*—Stanley H. Tollberg
*Attorney, Agent, or Firm*—Walter Becker

[57] ABSTRACT

A pneumatic vehicle tire with a blet and a radial carcass, in which the carcass rims are anchored on the tire beads by being passed around the core flags folded in a U-shaped manner around the tire beads. The steel cables which are parallel to each other and form the core flags are arranged at an angle to the tire circumferential direction, and at least a portion of the free ends of the carcass rims face toward the outer surfaces of the tire side walls. Those sections of the core flags which are adjacent the interior of the tire, and those core flag sections which are adjacent the outside of the tire are symmetrically arranged with regard to the plane of symmetry of the tire which is perpendicular to the axis of rotation of the tire.

4 Claims, 3 Drawing Figures

PATENTED JUN 10 1975

3,889,292

PNEUMATIC VEHICLE TIRE

The present invention relates to a pneumatic vehicle tire with a belt and a radial carcass, in which the carcass rims are so folded over the bead cores that they face the outwardly located surfaces of the tire walls, said carcass being surrounded by a reinforcement section of steel strands, or the like, placed around the core in a U-shaped form.

By a radial carcass is meant a carcass with thread-shaped strength carriers extending at a right angle or practically right angle with regard to the circumferential direction of the tire. Belts, on the other hand, are reinforcing inserts which are located within the region of the tire zenith portion and extend substantially over the width of the tread strip while stabilizing the tire against lateral forces. These stabilizing reinforcing inserts making up the belt may consist of one or more layers of threads, wires, or the like, which are parallel to each other. Experience has proved that with belted tires, the straight driving properties are disadvantageously influenced when the vehicle runs at high speeds, and also when the vehicle is accelerated or retarded. This so-called self-steering of the tires can be ascertained in particular when blocking the steering mechanism. There will then be noticed, an interdependence between the deviation from the normal course of the vehicle on one hand, and the driving moment at the rear axle on the other hand. When accelerating, the vehicle has the tendency to pull to one side of the road, whereas when retarding the vehicle, it pulls toward the opposite road side.

It is, therefore, an object of the present invention to overcome the above mentioned drawback and to improve the straightforward driving properties on one hand, and the life of the tires on the other hand.

These and other objects and advantages of the invention will appear more clearly from the following specification, in connection with the accompanying drawing, in which.

Figure 1:
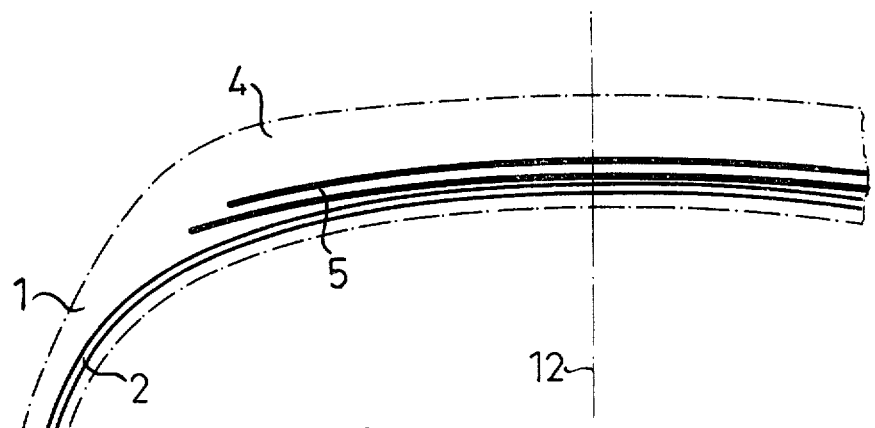
FIG. 1 is a section through a portion of a pneumatic vehicle tire according to the invention.
Figure 2:
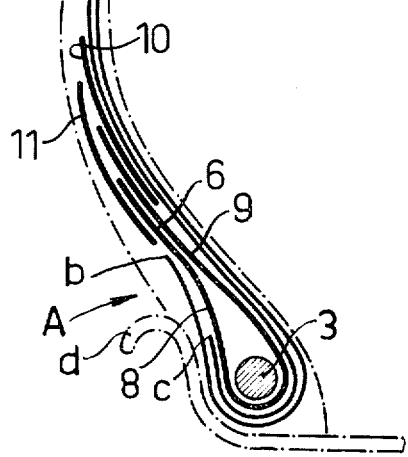
FIG. 2 is a portion partly in view and partly in section of a tire of FIG. 1, as seen in the direction of the arrow A.
Figure 2:
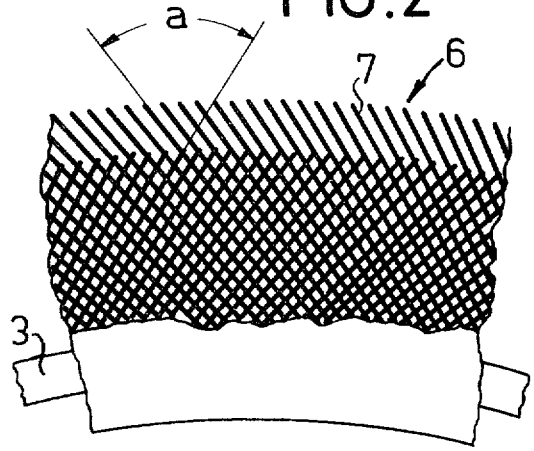

The pneumatic belted vehicle tire according to the present invention which has a radial carcass with the carcass rim being anchored at the tire beads by passing around the bead cores and the U-shaped reinforcing steel strand sections, is characterized primarily in that said U-shaped sections have those portions which face toward the interior of the tire and the laterally outwardly located sections arranged symmetrically with regard to the plane defined by the central plane of the tread surface. To this end, the two rims of said U-shaped reinforcing sections also extend beyond the carcass rims so that the ends of the U-shaped reinforcing sections without being covered by the carcass rims face the laterally outwardly located surfaces of the bead portions. This symmetrical arrangement of the U-shaped reinforcing sections, henceforth called core flags, has a stabilizing effect so that also during accelerations and slowdown, the straighforward running properties of the vehicle will also at high speeds not disadvantageously be influenced by the belted tire.

Referring now to the drawing in detail, the tire body 1 consists primarily of rubber, the contour of said tire body being indicated by dot-dash lines. The tire body 1 has a carcass which extends from bead to bead, which carcass consists primarily of pull-resistant threads substantially parallel to each other and extending practically at a right angle with regard to the circumferential direction of the tire. The bead cores are designated with the reference numeral 3. Between the tread strip 4 and the carcass 2 there is arranged a belt 5 which extends substantially over the entire width of the tread strip 4 and which is pull resistant in circumferential direction of the tire while increasing the resistance of the tire body 1 against lateral forces.

Immediately adjacent the bead cores 3 there are provided core flags 6 which consist of steel cables or wires 7 which are parallel to each other and which are placed in a U-shaped manner. These parallel steel cables or wires 7 cross each other in such a way that all steel cables 7 or wires will with regard to the strength carriers of the carcass 2 form an angle of 45°. Thus, the steel cables 7 form with each other an angle of approximately 90°.

The outwardly located leg or arm of the core flag 6 is designated with the reference numeral 8, whereas the inwardly located leg of the core flag 6 is designated with the reference numeral 9, said inwardly located leg projecting beyond the leg 8 to a slight extent.

The rims of the two-layer carcass 2 end in an offset or staggered manner at b and c far below the free ends of the legs 8 and 9. As a result thereof lateral ends of the core flag 6 are obtained which end free on the outside. However, for enclosing the ends of the legs 8, 9, cushioning strips 10 and 11 are inserted.

Figure 3:
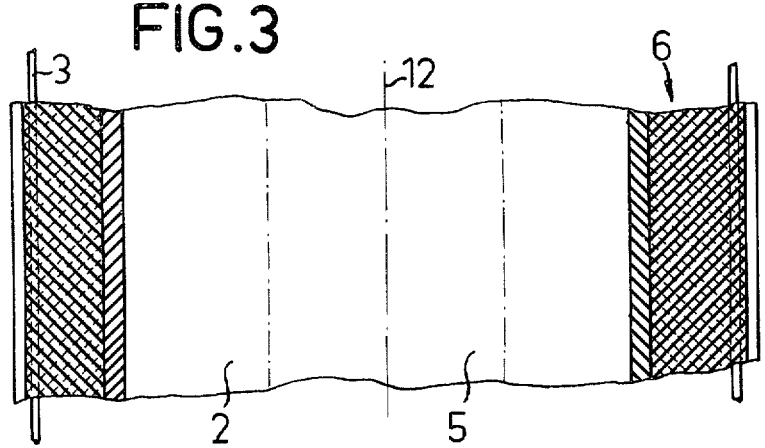
FIG. 3 illustrates the tire body as developed, and as seen in the direction toward the outer surface of the tire body.

In this connection it is important that, as will be evident from FIG. 3, with regard to the central line 12 of the tread surface or the plane determined thereby, the legs 9 of the two core flags 6 are arranged symmetrically with regard to each other. This applies correspondingly to the legs 8 of the two core flags 6. In this way, while considering the legs 8 and 9, and when viewed as an entirety, a V-shaped course of the steel cable 7 is obtained which results in the desired straightforward running effect while eliminating lateral pull even during acceleration and slowdown of the vehicle.

It may be also be mentioned that the ends at b and c end approximately at the level of the wheel flanges of the rim which are arranged at d, whereas the legs 8 and 9 are extended so far in the direction toward the zenith portion of the tire that they extend into the central range of the sidewalls of the tire or end in the range of half the height of the tire sidewalls.

Preferably, the carcass 2 is made of textile cord thread or relatively thin steel wires, whereas the core flags 6 are made of strong steel cables or strands or consist of threads or cables of similar strength and rigidity. With the embodiment of FIG. 1, also the edge at b of the outwardly located carcass layer is arranged at a higher level than the rim at c of the inner layer. It is possible also to have the outwardly located layer end already at c, and consequently to have the inner layer end at b. At any rate, the free extending rim, or the ends of the legs 8 and 9 are arranged so as to face the laterally outwardly located surface of the tire side walls.

It is, of course, to be understood that the present invention is, by no means, limited to the specific showing in the drawing, but also comprises any modifications within the scope of the appended claims.

What we claim is:

1. A pneumatic vehicle tire provided with bead cores, which includes in combination a circumferential belt, a radial carcass, and core flags formed by steel cables arranged substantially parallel to each other and folded in a U-shaped manner around said bead cores, the rims of said carcass being looped around said core flags so as to anchor said carcass rims on said bead cores, and said steel cables which form said core flags extending at an acute angle inclined with regard to the tire circumferential direction of the tire and at least a part of the free ends of the carcass rims facing the outer surfaces of the tire side walls, and leg portions of said core flags which are adjacent to the interior of said tire as well as those portions of said core flags which are adjacent to the outside of said tire being symmetrically arranged with regard to the central tire plane perpendicular to the axis of rotation of said tire.

2. A pneumatic vehicle tire in combination according to claim 1, in which the two free ends of said core flags extend in the side walls of the tire in the direction toward said belt projecting beyond the free ends of said carcass rims.

3. A pneumatic vehicle tire in combination according to claim 1, in which the free ends of the core flags extend in the side walls of the tire in the direction toward the respective adjacent tire shoulders so as to extend substantially through from one-third to one-half of the height of the tire side walls.

4. A pneumatic vehicle tire in combination according to claim 1, in which the steel cables of the core flags define with each other angles of approximately 90°.

* * * * *